United States Patent [19]
Meili

[11] Patent Number: 5,964,986
[45] Date of Patent: Oct. 12, 1999

[54] DISTILLATION PLANT

[75] Inventor: Albert Meili, Hettlingen, Switzerland

[73] Assignee: Sulzer Chemtech AG, Winterthur, Switzerland

[21] Appl. No.: 08/920,948

[22] Filed: Aug. 29, 1997

[30] Foreign Application Priority Data

Oct. 9, 1996 [EP] European Pat. Off. ............. 96810675

[51] Int. Cl.$^6$ ....................................................... B01D 3/00
[52] U.S. Cl. ........................ 202/155; 62/238.7; 202/172; 202/182; 202/186; 203/DIG. 4
[58] Field of Search ..................... 202/158, 172, 202/155, 186, 188, 189, 236, 182, 153, 173; 203/87, 72, 89, DIG. 4, 24, 26; 159/43.1, 49, 14; 62/238.7; 423/58.4; 261/DIG. 72

[56] References Cited

U.S. PATENT DOCUMENTS

| 3,644,179 | 2/1972 | Knoer ........................................... 203/72 |
| 4,217,176 | 8/1980 | Antony ..................................... 202/236 |
| 5,171,407 | 12/1992 | Meili ................................ 203/DIG. 4 |
| 5,507,356 | 4/1996 | Roth et al. ............................. 165/111 |

FOREIGN PATENT DOCUMENTS

| 142209 | 5/1985 | European Pat. Off. . |
| 172660 | 2/1986 | European Pat. Off. . |
| 0 419 406 A1 | 3/1991 | European Pat. Off. . |
| 2 479 701 | 10/1981 | France . |
| 340708 | 9/1921 | Germany . |
| 3542618 | 6/1987 | Germany . |
| 3622805 | 1/1988 | Germany . |
| 156101 | 6/1998 | Japan . |

*Primary Examiner*—Virginia Manoharan
*Attorney, Agent, or Firm*—Townsend and Townsend and Crew LLP

[57] ABSTRACT

A distillation plant contains a column with packings as well as a vaporizer. The elements of the column are arranged along a vertical axis and assembled as a constructional unit. They are executed in such a manner that a slight pressure drop sets in during the operation of the plant between a sump and a head. At least two vaporizers are provided, namely a first vaporizer, which is arranged in or directly above the sump, and an intermediate vaporizer which is arranged above the first vaporizer and a lower packing section; and/or at least two liquefiers are provided, namely a first liquefier, which is arranged in the head of the column, and an intermediate liquefier, which is arranged below the first liquefier and an upper packing section.

10 Claims, 2 Drawing Sheets

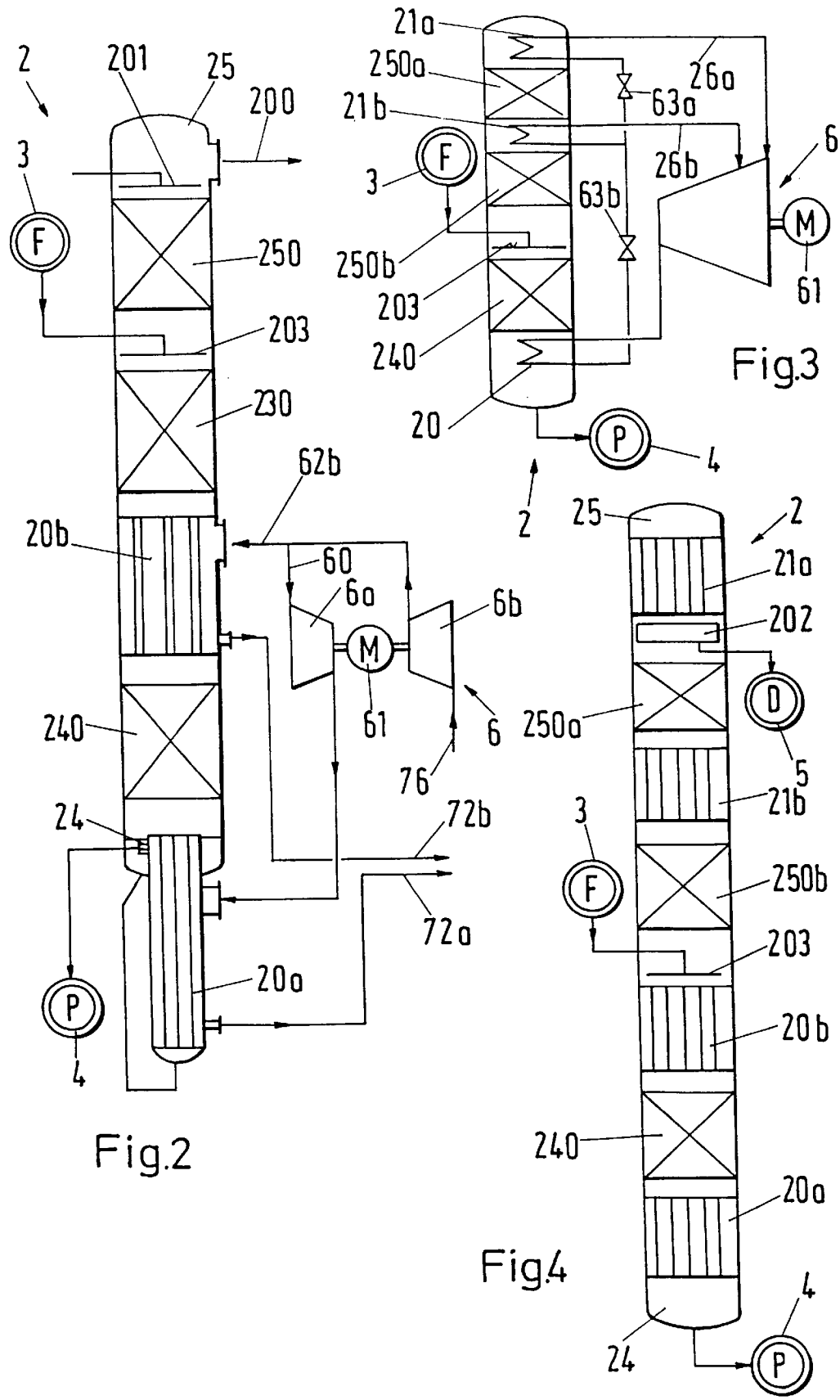

DISTILLATION PLANT

BACKGROUND OF THE INVENTION

1. Field of the Invention

The present invention relates to a distillation plant, and more particularly, to a distillation plant having relatively low operating and maximum temperatures.

2. Description of the Prior Art

A distillation plant is described in EP-A 0 419 406 in connection with the manufacture of concentrated hydrogen peroxide $H_2O_2$. This known plant is characterized by the fact that a low pressure drop is present between the sump and the head of the distillation column, and thus the relatively low operating and maximum temperatures offer an improved safety of the plant. The object of the present invention is to further develop the known plant. In this respect, a reduction of the energy costs should be achievable by the use of heat pumps.

SUMMARY OF THE INVENTION

In order to save energy during a distillation, a portion of the thermal energy arriving at the head of the column can be brought to a higher temperature level by means of a heat pump and the thus transformed thermal energy used for the heating of a sump vaporizer. In this arrangement a direct exhaust vapor compression can be used or a vapor jet compressor as well as any other kind of heat pump.

The greater the temperature difference between the heat sink of the sump and the heat source at the head of the column, the lower is the efficiency of the heat pump, and consequently the greater the specific energy required. The column can be equipped in accordance with the invention with two or more vaporizers at different temperature levels. The energy of the heat source must in this case be transformed only partially to the temperature level required for the sump vaporizer. The rest of the thermal energy required for the vaporizer need only be raised to the lower levels of the following heat sinks, resulting in a considerable reduction of the energy required for driving the heat pump.

Taking as an example the production of concentrated hydrogen peroxide $H_2O_2$ by using a direct exhaust vapor compression by means of a two-stage radial compressor and by using an ideally matched intermediate vaporizer a driving power of 1200 kW is required. This power is 300 kW less than the compressor drive power of the known plant, which likewise has a two-stage radial compressor. In an alternative embodiment with a vapor jet compressor, the amount of driving vapor is reduced from 12000 kg/h to slightly less than 10000 kg/h.

With the further development of the distillation plant in accordance with the invention smaller heat pumps are required, which also reduces the investment costs.

The plant in accordance with the invention is also suitable, for example, for a process with a so-called pure styrene column, in which low volatiles are separated from styrene.

BRIEF DESCRIPTION OF THE DRAWINGS

FIG. 2 is a schematic of an alternative embodiment of the plant of FIG. 1.

FIG. 3 is a schematic of a plant in accordance with the invention with two liquefiers; and FIG. 4 is a schematic of a distillation column of a plant in accordance with the invention with two liquefiers and two vaporizers.

DESCRIPTION OF THE PREFERRED EXEMPLARY EMBODIMENTS

Figure 1:
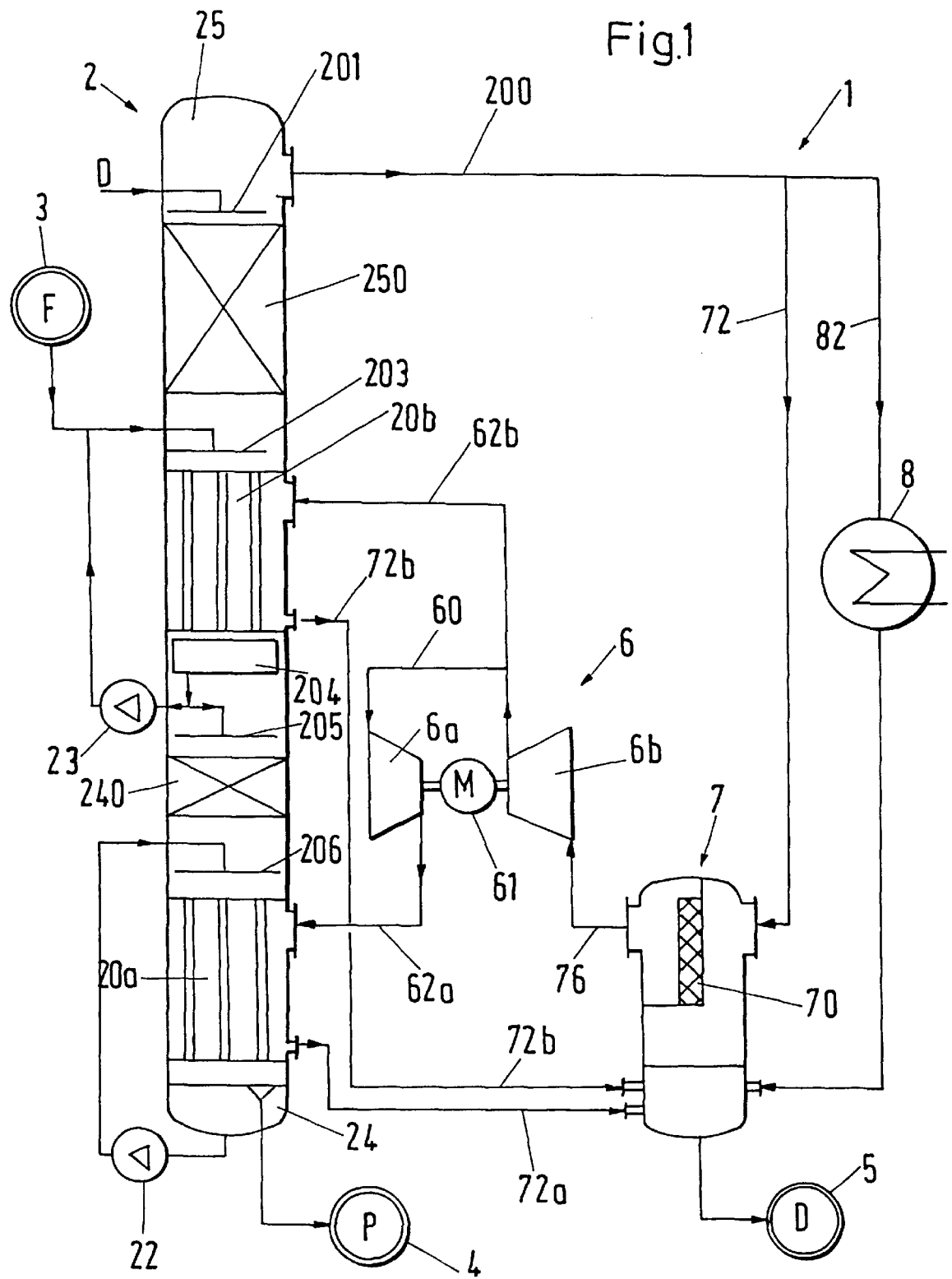
FIG. 1 is a schematic of a plant in accordance with the invention with a first vaporizer and an intermediate vaporizer.

The plant 1 in FIG. 1 is composed of a distillation column 2, a compressor 6, a distillate collector 7 and a condenser 8. A raw solution F from the reservoir 3 is fed into the column 1 and converted there into exhaust vapors and a product P (reservoir 4). The exhaust vapors are drawn off at the head 25 of the column 2 and the product P from the sump 24. A greater portion of the exhaust vapors is used as the working fluid of a heat pump, which is driven by a compressor 6. The compressed exhaust vapors represent the heat source for the distillation. The condensate arising during the heat transfer together with the condensate which arises from a non-compressed residue of the exhaust vapors in the condenser 8 jointly form the distillate D (reservoir 5).

The column 2 comprises the following components: a first vaporizer 20a, which is arranged directly above the sump 24; an intermediate vaporizer 20b, which is arranged above the first vaporizer 20a and a lower packing section 240; an upper packing section 250; a distributor 201 for the return flow (distillate D or demineralized water); a distributor 203 for the inflow, i.e. for the supplied raw solution F as well as for the solution circulated by a pump 23; a collector 204 as well as a distributor 205 for the solution which is concentrated in the vaporizer 20b; and furthermore a distributor 206 for the product P circulated by a pump 22.

The components are designed in such a manner that a slight pressure drop sets in between the sump 24 and the head 25 of the column 2: falling film vaporizers 20a and 20b; collectors 204 in the form of a known device with lamella; ordered packings 240 and 250 (vertical layers with corrugated lamella).

The exhaust vapors drawn off at the head 25 enter via a line 200 as well as lines 72 and 82 into the distillate collector 7 and into the condenser 8 respectively. The greater portion of the exhaust vapor which is conducted through a droplet separator 70 of the distillate collector 7 enters via a line 76 into a first stage 6b of the compressor 6 (radial compressor, driven by the motor 61), where the exhaust vapors are compressed to a pressure at which a condensation in the intermediate vaporizer 20b sets in. A portion of the intermediately compressed exhaust vapors flows—line 62b—into the intermediate vaporizer 20b and a portion—line 60—into a second stage 6a of the compressor 6. The second portion enters after the second compression via the line 62a into the first vaporizer 20a, where the exhaust vapors are condensed out exothermally at a higher temperature than in the intermediate vaporizer 20b. The exhaust vapors condensed in the vaporizers 20a and 20b flow through lines 72a and 72b into the distillate collector 7 and are relaxed there to the suction pressure of the compressor.

The first vaporizer 20a can—contrary to the exemplary embodiment of FIG. 1—also be arranged in the sump 24: shown in FIG. 2. The first vaporizer 20a can be executed here as a natural circulation vaporizer, a climbing film vaporizer or a rising tube vaporizer. It is also possible to design the intermediate vaporizer 20b in the form of one of the known vaporizer types.

The distillation column 2 of FIG. 2 additionally shows a further packing section 230 between the distributor 203 of the supply and the intermediate vaporizer 20b. Various details which can be seen in FIG. 1 are no longer shown in FIG. 2.

FIG. 3 shows a plant in accordance with the invention in which the exhaust vapors are condensed out within the column by means of a first liquefier 21a. An intermediate liquefier 21b is arranged below the first liquefier and an upper packing section 250a. A second packing section 250b is located between the intermediate liquefier 21b and the supply distributor 203. only one vaporizer 20 is provided below the lower packing section 240 in this example. A two-stage heat pump is present here which has a closed circulation of a substance as a working fluid that can be vaporised at two temperature levels—at different pressures—by the liquefiers 21a and 21b that are used as heat sources. Accordingly, the compressor 6 has two inputs and supply lines 26a, 26b for the vaporous working fluid. The compressed working fluid arrives via the line 62 into the only vaporizer 20 of the distillation column, where it is condensed exothermally.

The condensed working fluid flows through the throttle members 63b and 63b into the two vaporizers 21b and 21a respectively, where it is vaporized endothermally.

FIG. 4 shows finally a distillation column 2 in which two vaporizers 20a and 20b as well as two liquefiers 21a and 21b are arranged. Below the upper liquefier 21a a collector 202 collects the distillate D. The further components have already been described in connection with the other examples.

When a heat pump is used it can be advantageous to use only one of the liquefiers 21a and 21b as a heat source or only one of the vaporizers 20a and 20b as a heat sink for the heat pump. Whether this is advantageous depends on the availability of further favorable means for heating and/or cooling purposes which can occasionally be used when performing a distillation.

The plant 1 in accordance with the invention can be used especially advantageously for the production of concentrated hydrogen peroxide $H_2O_2$, in which a product solution P which contains about 70% $H_2O_2$ can be manufactured from a raw solution F which contains about 30% $H_2O_2$. The distillate D is water which contains at most 0.01% $H_2O_2$. The raw solution can have a different $H_2O_2$ concentration in the range from 25 to 45%. Occasionally it is sufficient to produce a product solution with 50 or 60% $H_2O_2$.

What is claimed is:

1. A distillation plant comprising:
    a column;
    packing arranged along a vertical axis within the column;
    at least two vaporizers arranged along the vertical axis within the column;
    a sump;
    a head of the column; and
    at least two liquefiers arranged along the vertical axis within the column;
    wherein the packings and the vaporizers are executed such that a slight pressure drop arises during operation of the plant between the sump and the head of the column;
    wherein a first of the at least two vaporizers is arranged one of either in or directly above the sump;
    wherein an intermediate vaporizer of the at least two vaporizers is arranged above the first vaporizer and a lower packing section;
    wherein a first liquefier of the at least two liquefiers is arranged in the head of the column; and
    wherein an intermediate liquefier of the at least two liquefiers is arranged below the first liquefier and an upper packing section.

2. A plant in accordance with claim 1 further comprising a heat pump that produces a heat transporting and a heat transforming connection between the head of the column and the sump;
    wherein the heat pump is executed in at least two stages; and
    wherein the first vaporizer and the intermediate vaporizer represent heat sinks of the heat pump at two temperature levels.

3. A plant in accordance with claim 2 wherein the first liquefier and the intermediate liquefier represent heat sources of the heat pump at two temperature levels.

4. A plant in accordance with claim 3 wherein the heat pump uses a substance in a closed circuit as a working fluid that can be vaporized by the vaporizers that are used as the heat sources.

5. A plant in accordance with claim 2 wherein the heat pump comprises an at least two-stage condenser and uses a working fluid that can be condensed to a temperature level of the vaporizers after a vapor compression, the plant further comprising a two-stage radial compressor.

6. A plant in accordance with claim 5 wherein the plant is configured such that exhaust vapors that can be drawn off at the head of the column serve as the working fluid.

7. A plant in accordance with claim 1 wherein at least the intermediate vaporizer is executed as a falling film vaporizer.

8. A plant in accordance with claim 1 wherein the first vaporizer is executed as one of a natural circulation vaporizer, a climbing film vaporizer, or a rising tube vaporizer.

9. A plant in accordance with claim 1 wherein the packings are structured in an ordered manner and have vertical layers with corrugated lamella.

10. A plant in accordance with claim 1 further comprising a supply line for a raw product with a distributor, the supply line being arranged above the intermediate vaporizer, wherein a further packing section is arranged between the distributor and the intermediate vaporizer.

* * * * *